United States Patent [19]
Hughes et al.

[11] Patent Number: 5,264,542
[45] Date of Patent: Nov. 23, 1993

[54] PROCESS FOR PREPARING STABILIZED POLYBENZIMIDAZOLE PRODUCTS

[75] Inventors: O. Richard Hughes, Chatham; Dieter Kurschus, Bayville, both of N.J.

[73] Assignee: Hoechst Cleanese Corp., Somerville, N.J.

[21] Appl. No.: 888,664

[22] Filed: May 27, 1992

[51] Int. Cl.⁵ .............. C08G 69/08; C08J 5/00; C08L 77/06
[52] U.S. Cl. ................ 528/331; 264/331.16; 264/331.18; 525/435
[58] Field of Search ........... 528/331; 264/331.16, 264/331.18; 525/435

[56] References Cited

U.S. PATENT DOCUMENTS

| | | | |
|---|---|---|---|
| 4,567,221 | 1/1986 | Maruyama et al. | 524/437 |
| 4,912,176 | 3/1990 | Alvarez et al. | 521/134 |
| 4,927,909 | 5/1990 | Wadhwa et al. | 528/331 |

Primary Examiner—John Kight, III
Assistant Examiner—T. Mosley
Attorney, Agent, or Firm—Isaac Angres

[57] ABSTRACT

A process for preparing shaped polybenzimidazole sintered products having increased resistance to dimensional modification by absorption of water and the products prepared therefrom.

4 Claims, 4 Drawing Sheets

PROCESS FOR PREPARING STABILIZED POLYBENZIMIDAZOLE PRODUCTS

BACKGROUND OF THE INVENTION

The invention relates to polybenzimidazole articles and process for their production. More particularly, the invention relates to acid treated articles prepared from sintered polybenzimidazoles and a process for their production.

Polybenzimidazoles ar a known class of heterocyclic polymers which are characterized by a high degree of thermal and chemical stability. Processes for their production are disclosed in U.S. Pat. No. Re. 26,065, and U.S. Pat. Nos. 3,313,783; 3,509,108; 3,555,389; 3,433,772; 3,408,336; 3,549,603; 3,708,439; 4,154,919; and 4,312,976. All of the above-listed patents are incorporated herein by reference.

Aromatic polybenzimidazoles may be shaped to form fibers, films, and sintered articles of wide utility. The shaped products display great resistance to degradation by heat, hydrolytic media, and oxidizing media. Polybenzimidazole products have an ability to withstand continued exposure to elevated temperatures. The polymers may, for example, be dissolved in concentrated sulfuric acid and recovered without degradation by dilution with water.

Aromatic polybenzimidazoles are characterized by melt temperatures above about 400° C., and, in many instances, by an ability to withstand temperatures in excess of about 500° C. without softening or degrading. The polymer derived from isophthalic acid and 3,3'-diaminobenzidine is not melted by exposure to a temperature of 770° C. and loses only 30% of its weight after exposure for several hours at temperatures up to 900° C.

Further, although polybenzimidazole polymers are generally, more resistant to swelling by water than other types of polymers, such as cellulose acetate polymers, in a humid environment polybenzimidazole will absorb an appreciable amount of water. Hydrogen bonding at the site of the imidazole nitrogen-hydrogen bond with a water molecule will occur under humid conditions, thereby adversely affecting the performance of the polybenzimidazole polymer.

One method of reducing the hydrogen-bonding capability of the polybenzimidazole polymer is to replace the imidazole hydrogen with a hydrophobic species such as fluorine, phenol, trifluoromethyl and the like.

The present process seeks to reduce the ability of sintered polybenzimidazole products to absorb moisture from the environment. In situations where high dimensional stability is reguired, a non-swellable polybenzimidazole is desired. The present process comprises maintaining a liguid bath comprising water and a Lowry-Bronsted acid and immersing in the bath a polybenzimidazole substrate which was prepared from polybenzimidazole powder by a sintering process. The substrate is then removed from the acid bath, and dried in an inert atmosphere. Then the substrate is heat treated to obtain a final product. The final product is a sintered acid-treated polybenzimidazole substrate with has a substantially reduced capacity for absorbing moisture.

U.S. Pat. No. 4,927,909 (Wadhwa et al) discloses a process for the production of thermally stable polybenzimidazole films which comprises treating a sheet of polybenzimidazole with an agueous solution of phosphoric acid. This patent, however, fails to disclose a process for treating sintered polybenzimidazole substrates for the purpose of reducing moisture sorption capacity.

U.S. Pat. No. 4,460,708 (Stuetz) discloses a process for preparing activated carbon fibers comprising a step of treating a polybenzimidazole substrate with an acid solution. Phosphoric acid is disclosed as one of the possible acids useful in the invention. The '708 patent does not teach the preparation of a moisture resistant sintered polybenzimidazole substrate.

U.S. Pat. No. 4,628,067 (Chen, Sr. et al) discloses the treatment of polybenzimidazole resins with acidic solutions to prepare functionalized derivatives useful in the fields of catalysis and ion exchange resin preparation. The '067 patent fails to disclose acid treatment of sintered polybenzimidazole substrates to enhance moisture resistance characteristics.

Of particular interest in the preparation of useful polybenzimidazole shaped articles have been processes for preparing dimensionally stable substrates which can tolerate environments of high humidity. Here are numerous instances in which sintered polybenzimidazole parts are shaped to desired close dimensional tolerances, and will, if left untreated, change dimension on standing in uncontrolled humid atmospheres.

Accordingly, it is an object of the present invention to disclose a process for the preparation of sintered polybenzimidazole substrates having a substantially decreased capacity for sorbing moisture.

It is a further object of this invention to disclose a product prepared according to the process as outlined above.

These and other objects, as well as the scope, nature and utilization of the process and the products produced by that process will be apparent to those skilled in the art, from a review of the following detailed description and appended claims.

SUMMARY OF THE INVENTION

In accordance with the present invention, there is provided a moisture resistant, sintered prlybenzimidazole substrate with is prepared by the following process:

(a) maintaining a bath comprising agueous phosphoric acid solution at a concentration of about 50 to 100% phosphoric acid and a temperature of about 90° to 110° C., (b) immersing in said bath at least one substrate comprising a sintered polybenzimidazole for a time of about one to seven days, (c) removing the substrate from the acid bath, (d) drying the substrate in an inert atmosphere at a temperature of about 150° to 250° C. for a time of about 1 to 7 days, and (e) heat treating said substrate in a furnace at a temperature of about 350° C. to 450° C.

DETAILED DESCRIPTION OF THE INVENTION

The polybenzimidazole starting materials are a known class of heterocyclic polymers which are characterized by a recurring monomeric unit which corresponds to the following formulas I or II. Formula I is:

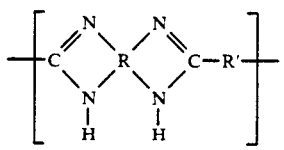

wherein R is a tetravalent aromatic nucleus with the nitrogen atoms forming the benzimidazole rings being paired upon adjacent carbon atoms, i.e., ortho carbon atoms, of the aromatic nucleus, and R' is a divalent substituent selected from aliphatic, alicyclic and aromatic radicals. Illustrative of R' substituents are divalent organic radicals containing between about 2 to about 20 carbon atoms, such as ethylene, propylene, butylene, cyclohexylene, phenylene, pyridine, pyrazine, furan, thiophene, pyran, and the like.

Formula II corresponds to the structure:

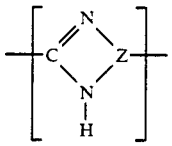

where Z is an aromatic nucleus having the nitrogen atoms forming the benzimidazole ring paired upon adjacent carbon atoms of the aromatic nucleus.

The above illustrated polybenzimidazoles can be prepared by various known processes, as described in the Background of Invention section.

The following generalized eguation illustrates the condensation reaction which occurs in forming the polybenzimidazoles having the recurring units of Formula I:

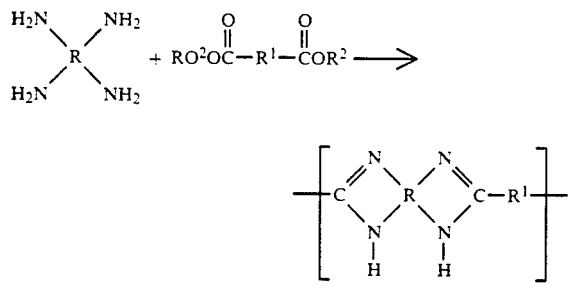

Such polybenzimidazoles are produced by the reaction of a mixture of (1) at least one arotic tetraamine containing two groups of amine substituents, the amine substituents in each group being in an ortho position relative to each other, and (2) at least one dicarboxylate ester in which $R^1$ and $R^2$ in the compounds shown are substituents selected from aliphatic, alicyclic and aromatic groups.

Examples of polybenzimidazoles which have the recurring structure of Formula I include:
poly-2-2'-(m-phenylene)-5,5'-bibenzimidazole;
poly-2,2'-(pyridylene-3", 5")-5,5'-bibenzimidazole;
poly-2,2'-(furylene-2", 5")-5,5,-bibenzimidazole;
poly-2,2'-(naphthalene-1", 6")-5,5'-bibenzimidazole;
poly-2,2'-(biphenylene-4", 4")-5,5'- bibenzimidazole;
poly-2,2'-amylene-5,5'-bibenzimidazole;
poly-2,2'-octamethylene-5,5'-bibenzimidazole;
poly-2,6'-(m-phenylene)-diimidazobenzene;
poly-2,2'-(m-phenylene)-5,5'-di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2,2'-(m-phenylene)-5', 5"-di(benzimidazole)-propane-2,2; and
poly-2,2'-(m-phenylene)-5', 5"-di(benzimidazole)ethylene-1,2.

The preferred polybenzimidazole of Formula I is poly-2,2'-(m-phenylene)-5,5'-bibenzimidazole as characterized by the following recurring monomeric unit:

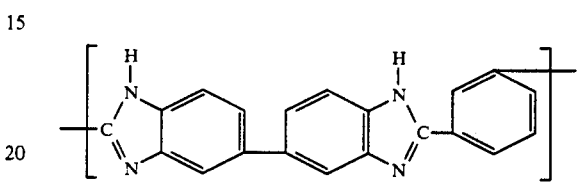

The polybenzimidazoles having the recurring monomer unit of Formula II can be prepared by the autocondensation of at least one aromatic compound having a pair of amine substituents in an ortho position relative to each other and a carboxylate ester group positioned upon an aromatic nucleus. Examples of such compounds are esters of diaminocarboxylic acids which include 3,4-diaminonaphthalene acid; 5,6-diaminonaphthalene-1-carboxylic acid; 5,6-diamino-naphthalene-2-carboxylic acid; 6,7-diaminonaphthalene-1-carboxylic acid; and the like.

Shaped articles prepared from polybenzimidazole powder by well-known sintering processes are in many instances machined to exact specifications. However, it is known that even sintered articles have a tendency to sorb moisture, thus creating a need for a treatment process which renders dimensional stability to the articles.

Figure 1:
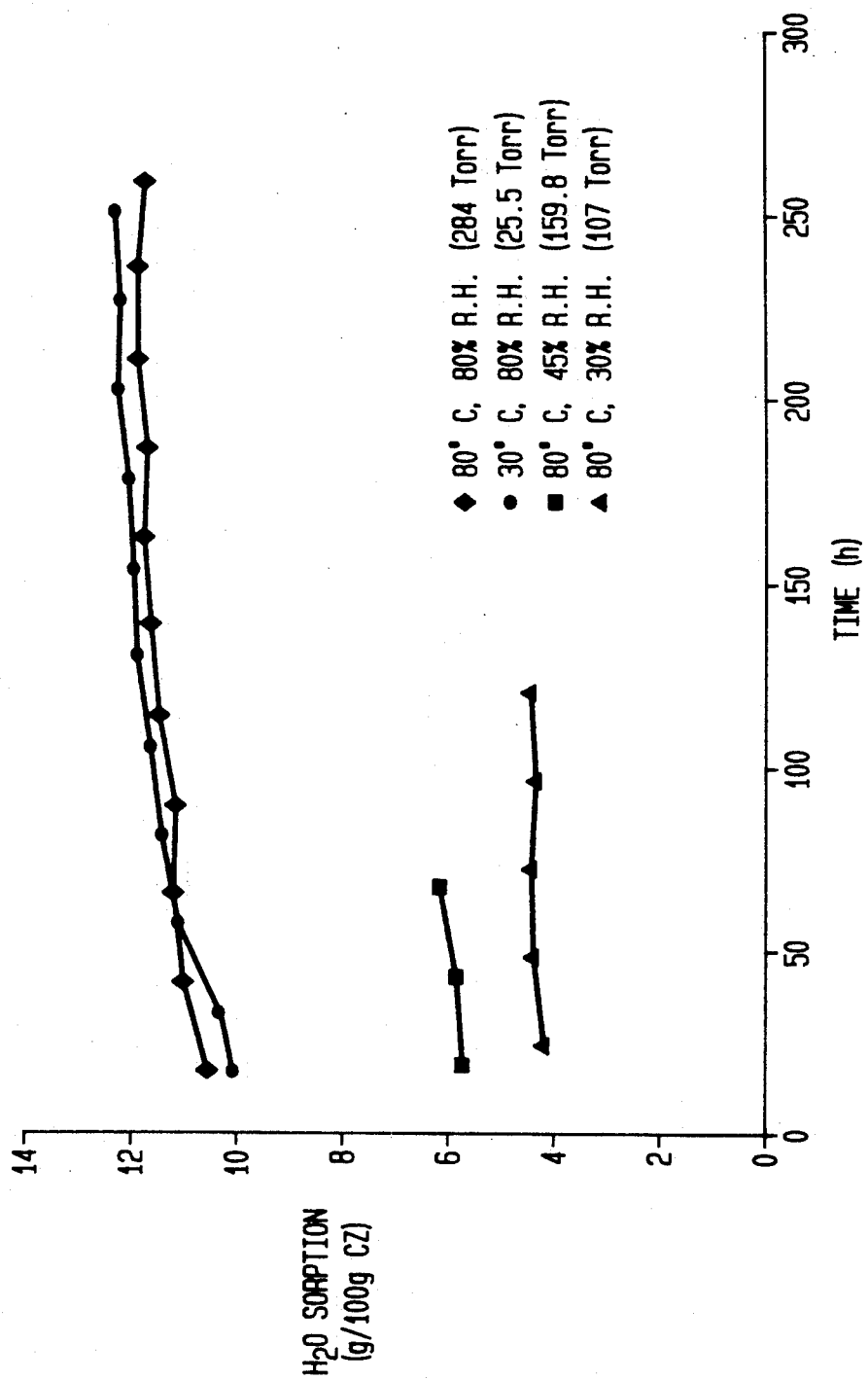
Referring to FIG. 1, the ability of polybenzimidazole powder to absorb water is shown by the graph which plots four different sets of temperature and water vapor pressure conditions. Polybenzimidazole powder absorbs substantial amounts of water at a humidity of 80% (284 torr), even at a temperature of only 30° C. The amount of water sorbed is measured in grams $H_2O$ per 100 g. powder. At 80% humidity about 12 grams of water are absorbed per 100 grams powder when the temperature is 80° C.
Figure 2:
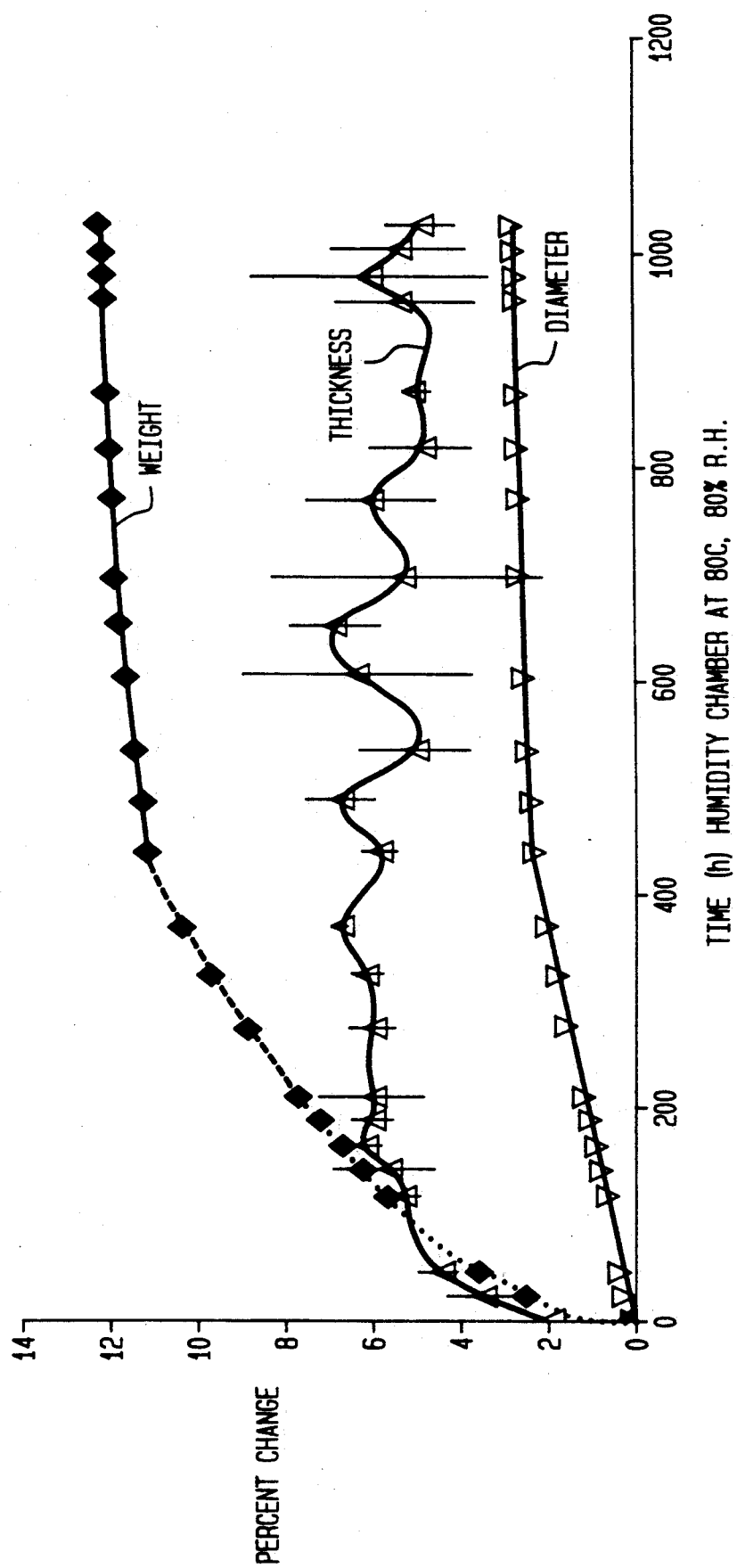

Referring to FIG. 2, the rate at which water is absorbed by a sintered, shaped, untreated polybenzimidazole disk is shown by a graph which plots the time in a humidity chamber versus the per cent change in weight. The per cent change in thickness of the disk and in diameter of the disk is also plotted. The humidity chamber is maintained at a temperature of 80° C. and a water vapor pressure of 284 torr (80% R.H.). There is a steady increase in weight of the sintered disk due to water absorption until the water absorbed reaches about 12% of the total weight of the disk. The thickness of the disk changes in a pseudo sinusoidal fashion as time in the humidity chamber increases. The maximum change in thickness is about 7% over a period of about 1000 hours. The diameter of the sintered disk also changes during exposure in the humidity chamber. The original measurements of the disk are one-eighth inch thick and two and one-half inches in diameter.

The present process treats an already sintered article to decrease the rate of moisture absorbance. The sintered article is immersed in an acidic bath. The acid is of the Lowry-Bronsted type. Preferably the acid is a member selected from the group consisting of phosphoric acid, phosphorous acid, phenyl phosphonic acid, phosphoryl chloride, sulfuric acid, sulfurous acid, sulfamic acid, phosphomolybdic acid, silicic acid, selenenic acid, phenylselenenic acid, boric acid and mixtures thereof.

The acid concentration can be in the range of about 50% to 100% in an agueous liguid bath. The liguid bath is maintained at a temperature of about 20° to 110° C. In a preferred embodiment, the bath is maintained at a temperature of about 90° C. to 110° C. since the process of diffusion of the acid into the sintere polybenzimidazole substrate is faster at higher temperatures.

The polybenzimidazole substrate is immersed in the bath for a time of about one to seven days.

After the period of immersion, which varies in accordance with the thickness of the polybenzemidazole substrate, said substrate is removed from the acid bath and dried in an inert atmosphere for a time of about one to seven days. Time of immersion must be such that the acid can diffuse into the substrate to a substantial degree. Following the drying period, the substrate is heat treated at a temperature of about 350° C. to 450° C. for a time of about 15 minutes to one hour.

In a most preferred embodiment, a sintered polybenzimidazole substrate is machine shaped to close dimensional tolerances. The substrate is then immersed in an agueous bath comprising an 85% solution of phosphoric acid. The immersion is maintained for a time of about seven days. After removal from the concentrated phosphoric acid solution, the substrate is dried at a temperature of about 200° C. Following the drying step, the substrate is heat treated at a temperature of about 400° C. for a time of about one hour. The result is a dimensionally stable sintered polybenzimidazole product.

Figure 3:
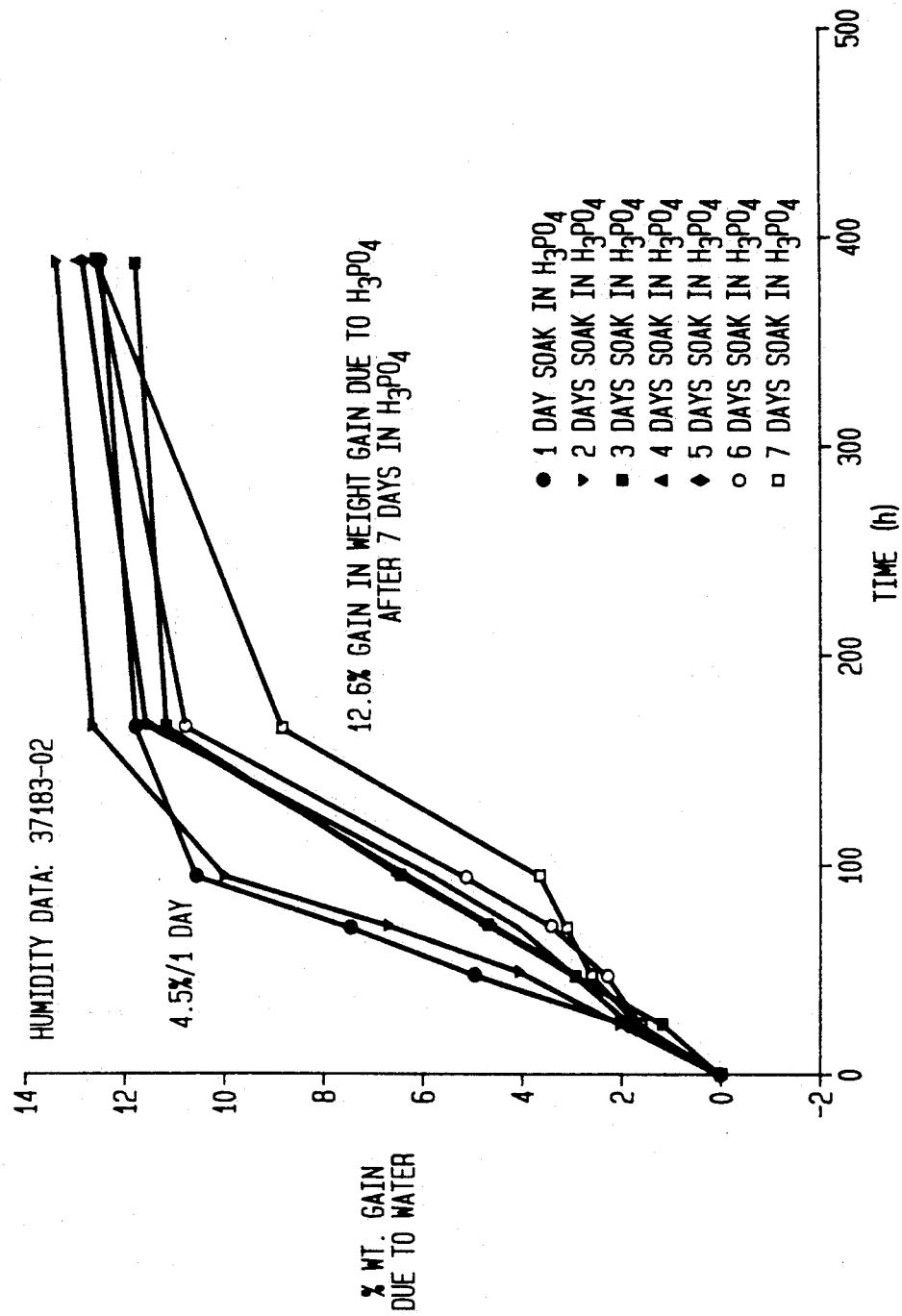

Referring to FIG. 3, the amount of water absorbed by acid treated sintered polybenzimidazcle disks is displayed by the graph. Seven acid-treated disks are placed in a chamber adjusted for a humidity of 80% (284 torr) and a temperature of 80° C. FIG. 3 graphically displays the rate of weight gain based on absorbed water for each of the seven disks for a time of almost seventeen days. Each of the acid-treated disks gains between about 10% and 14% weight after almost seventeen days.

The acid treated disks of FIG. 3 are prepared in the following manner. Seven disks having the following dimensions are placed in a bath having 50% $H_3PO_4$. The dimensions of the disks are: thickness (0.040 inches), diameter (0.5 inches), and having a center hole with a diameter of 0.128 inches. The agueous bath is maintained at a temperature of 100° C. After the disks have been soaked in the bath for the designated amount of time, they are dried at a temperature of 200° C. and finally heat treated at a temperature of 400° C.

Figure 4:
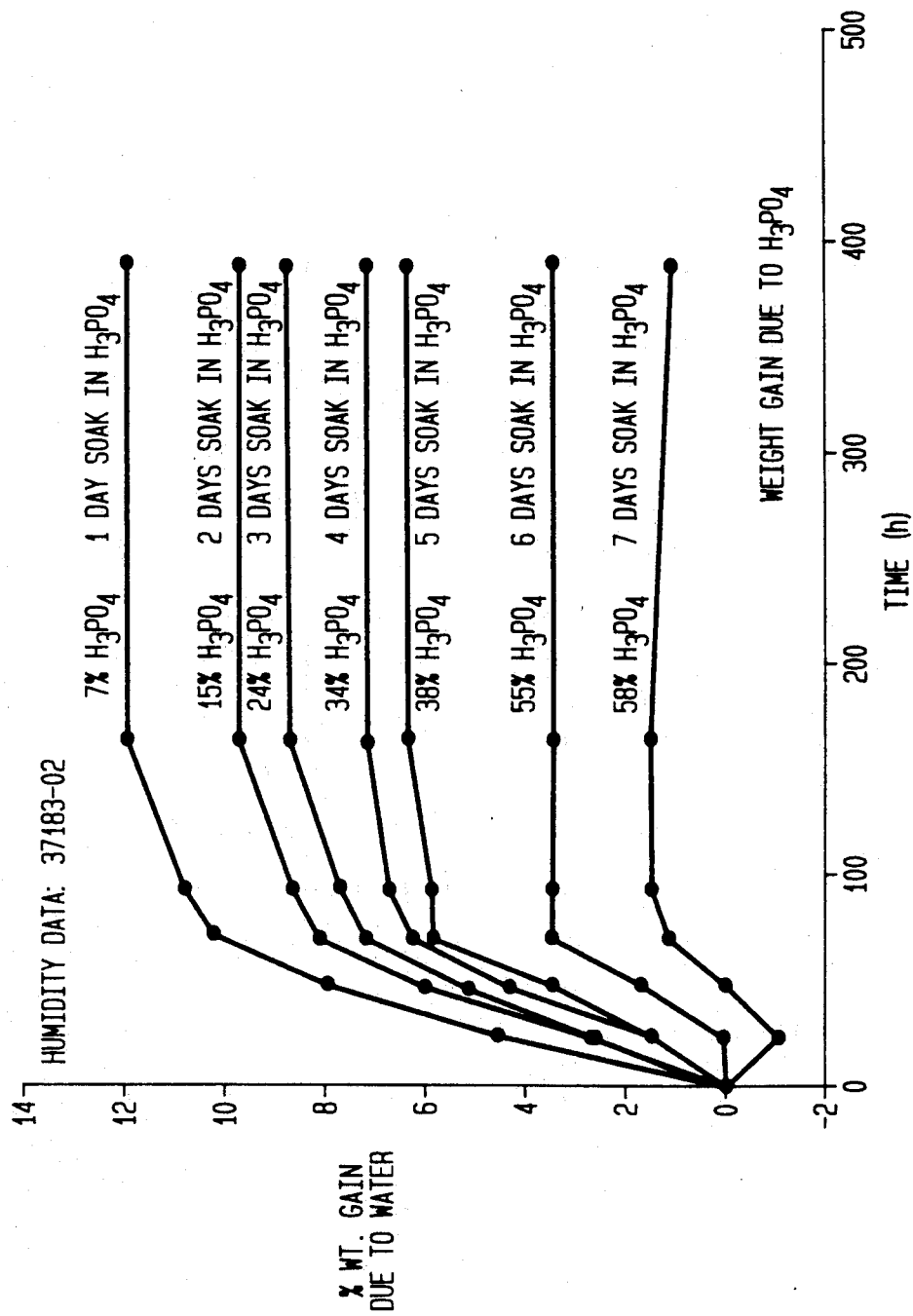

Referring to FIG. 4, the amount of water absorbed by seven different acid-treated polybenzimidazole sintered disks when the disks are placed in a humid environment is displayed by the graph. Each of the disks has the following dimensions prior to acid-treatment: a thickness of 0.040 inches, a diameter of 0.5 inches, and a center hold of 0.128 inches in a diameter. Each of the sintered disks is treated from one to seven days in an agueous bath containing 85% phosphoric acid. The bath is maintained at a temperature of 100° C. After soaking in the bath for the designated amount of time, each disk is dried at a temperature of 200° C. and finally heat treated at a temperature of 400° C. The disks are then ready to be placed in a humidity chamber which is maintained at a humidity of 80% (284 torr) and a temperature of 80° C. The graph of FIG. 4 shows the amount of weight gain due to absorbed water over time for each of seven disks. After about seventeen days, the disk which was immersed for one day gains almost 12% weight. After the same amount of time, the disk which was immersed for seven days gains less than 2% weight due to moisture absorption.

EXAMPLE 1

Amount of acid absorption by sintered polybenzimidazole disks was determined in the following manner. Seven small sintered polybenzimidazole disks (disk #1 to disk #7) were submerged in a bath containing 50% HPO. After 24 hours disk #1 was removed from the acid bath and dried in a nitrogen atmosphere at 200° C. for 96 hours. Following the drying, disk #1 was heat treated at a temperature of 400C. for about 10 minutes. The product is a moisture resistant sintered polybenzimidazole disk.

The procedure was repeated for the remaining disks (#2–#7) at various intervals of immersion in the acid bath. Results of this experiment are recorded in Table 1. All of the disks showed an increase in weight. Disk #7, which was immersed in the acid solution for 168 hours, showed an increase in weight of 12.64%.

TABLE 1

| Disk # | Initial Weight | Time of Immersion 50% $H_3PO_4$ | Drying Time | Final Weight | Weight Increase (%) |
|---|---|---|---|---|---|
| 1 | 0.154 g | 24 hours | 96 hours | 0.161 g | 4.55% |
| 2 | 0.144 g | 48 hours | 96 hours | 0.151 g | 4.86% |
| 3 | 0.160 g | 78.5 hours | 89.5 hours | 0.171 g | 6.88% |
| 4 | 0.162 g | 101.5 hours | 90.5 hours | 0.174 g | 7.41% |
| 5 | 0.160 g | 120 hours | 96 hours | 0.173 g | 8.13% |
| 6 | 0.163 g | 144 hours | 97 hours | 0.178 g | 9.20% |
| 7 | 0.174 g | 168 hours | 96 hours | 0.196 g | 12.64% |

EXAMPLE 2

Amount of acid absorption by sintered polybenzimidazole disks was determined by placing seven disks (disk #8 to disk #14) in a bath containing 85% phosphoric acid. Disk #8 was retrieved from the bath after 24 hours and dried in an oven under a nitrogen atmosphere at 200° C. for a time of 96 hours. Disk #8 was then heat treated at 400° C. for about ten minutes. The product is a moisture resistance sintered disk. The procedure was repeated for the remaining disks (#9 to #14) with various intervals of immersion in the acid bath.

Results of the experiment are recorded in Table 2. All of the disks showed an increase in weight which is due to the absorption of phosphoric acid.

TABLE 2

| Disk # | Initial Weight | Time of Immersion 85% $H_3PO_4$ | Drying Time | Final Weight | Weight Increase (%) |
|---|---|---|---|---|---|
| 8 | 0.164 g | 24 hours | 96 hours | 0.177 g | 7.93% |
| 9 | 0.162 g | 48 hours | 96 hours | 0.186 g | 14.82% |
| 10 | 0.157 g | 78.5 hours | 89.5 hours | 0.197 g | 25.48% |
| 11 | 0.157 g | 101.5 hours | 90.5 hours | 0.212 g | 35.03% |
| 12 | 0.149 g | 120 hours | 96 hours | 0.209 g | 40.27% |

TABLE 2-continued

| Disk # | Initial Weight | Time of Immersion 85% H₃PO₄ | Drying Time | Final Weight | Weight Increase (%) |
| --- | --- | --- | --- | --- | --- |
| 13 | 0.151 g | 144 hours | 97 hours | 0.237 g | 56.95% |
| 14 | 0.159 g | 168 hours | 96 hours | 0.270 g | 69.81% |

EXAMPLE 3

Acid-treated, heat-set polybenzimidazole sintered disks (disk #1 to disk #14) were placed in a humidity chamber. The chamber is maintained at a temperature of 80° C. and a relative humidity of 80%. After 24 hours, disk #1 showed an increase in weight of 1.86%; and after 164.5 hours, the same disk showed an increase in weight of 11.80%. Disk #14, which had the greatest acid absorption before drying and heat set treatment, showed an increase in weight due to moisture of 1.12% after 24 hours in the humidity chamber. After 164.5 hours in the chamber, disk #14 showed a 1.49% increase in weight.

Results of the experiment are recorded in Table 3. Disks which have absorbed the greatest amount of acid prior to drying and heat set treatment show the most resistance to moisture absorption when in a humid environment.

TABLE 3

| disk No. | Temp. - Humidity | After 24 hrs | After 47.5 hrs | After 70.5 hrs | After 93.5 hrs | after 164.5 hrs |
| --- | --- | --- | --- | --- | --- | --- |
| 1 | 80° C. - 80% | 1.86 | 4.97 | 7.45 | 10.58 | 11.80 |
| 2 | 80° C. - 80% | 2.00 | 4.00 | 6.67 | 10.00 | 12.67 |
| 3 | 80° C. - 80% | 1.18 | 2.94 | 4.71 | 6.47 | 11.18 |
| 4 | 80° C. - 80% | 1.73 | 2.89 | 4.62 | 6.36 | 11.56 |
| 5 | 80° C. - 80% | 1.74 | 2.91 | 4.07 | 5.81 | 11.63 |
| 6 | 80° C. - 80% | 1.71 | 2.27 | 3.41 | 5.11 | 10.80 |
| 7 | 80° C. - 80% | 1.55 | 2.59 | 3.11 | 3.63 | 8.81 |
| 8 | 80° C. - 80% | 4.55 | 7.96 | 10.23 | 10.80 | 11.93 |
| 9 | 80° C. - 80% | 2.67 | 5.91 | 8.07 | 8.60 | 9.68 |
| 10 | 80° C. - 80% | 2.56 | 5.13 | 7.18 | 7.69 | 8.72 |
| 11 | 80° C. - 80% | 1.43 | 4.29 | 6.19 | 6.67 | 7.14 |
| 12 | 80° C. - 80% | 1.46 | 3.40 | 5.83 | 5.83 | 6.31 |
| 13 | 80° C. - 80% | 0 | 1.71 | 3.42 | 3.42 | 3.42 |
| 14 | 80° C. - 80% | 1.12 | 0 | 1.12 | 1.49 | 1.49 |

EXAMPLE 4

Two disks made from sintered polybenzimidazole were placed in a bath of 50% H₃PO₄ for a period of 168 hours. One of the disks (disk #15) weight 13.221 g. prior to immersion in the acid bath. The other disk (disk #16) weighed 12.148 g. prior to acid treatment. After being immersed in the acid bath, dried for 286 hours at a temperature of 200° C., and heat treated for 1/6 hour at a temperature of 430° C., disk #15 weighed 13.514 g. Disk #16, following the same treatment, weighed 12.457 g. Disk 15 shows a 2.22% increase in weight and disk #16 shows a 2.54% increase in weight. Results of this experiment are recorded in Table 4. These two disks are now ready for testing in a humidity chamber.

TABLE 4

| Disk No. | Initial Weight | Weight After Immersion (50% H₃PO₄ for 168 hours) | Wt. Incrs. | Weight After Drying 200° C. for 286 hours | Wt. After Heat treating 430° C. for 1/6 hour | Wt. Incrs (%) |
| --- | --- | --- | --- | --- | --- | --- |
| 15 | 13.221 g | 13.976 g | 5.71 | 13.532 g | 13.514 g | 2.22 |
| 16 | 12.148 g | 12.896 g | 6.16 | 12.469 g | 12.457 g | 2.54 |

EXAMPLE 5

The two disks from EXAMPLE 4, disk #15 and disk #16, are placed in a humidity chamber. The chamber is maintained at a relative humidity of 80% and a temperature of 80° C. The increase in weight of each acid-treated disk was determined at various intervals of time. After about 40 hours, disk #15 increased in weight by 0.61% and disk #16 increased in weight by 0.64%. After 583 hours in the humidity chamber, disk #15 increased in weight by 10.82%. These two disks had been acid-treated in a 50% H₃PO₄ solution. Results of the humidity chamber experiment on disks #15 and #16 are recorded in Table 5.

Many eguivalent modifications will be apparent from a reading of the above to those skilled in the art without a departure from the inventive concept which is limited and defined only by the appended claims.

TABLE 5

| DSK No. | Temp./ Humidity | 40.5 hrs | 63.5 hrs | 87 hrs | 158 hrs | 181 hrs | 204.5 hrs | 323 hrs | 370 hrs | 417 hrs | 465 hrs | 512 hrs | 583 hrs |
| --- | --- | --- | --- | --- | --- | --- | --- | --- | --- | --- | --- | --- | --- |
| 15 | 80° C./ 80% | .61 | .89 | 1.23 | 2.58 | 3.04 | 3.43 | 5.54 | 6.30 | 7.10 | 7.83 | 8.54 | 9.55 |
| 16 | 80° C./ 80% | .64 | .94 | 1.33 | 2.91 | 3.44 | 3.96 | 6.41 | 7.33 | 8.22 | 9.07 | 9.85 | 10.82 |

What is claimed is:

1. A process for preparing dimensionally stable polybenzimidazole machine shaped products comprising:
    (a) maintaining a liguid bath comprising water and Lowry-Bronsted acid at an acid concentration of about 50% to 100% and at a temperature of about 90° C. to 110° C.
    (b) immersing in the bath for a time of about one to seven days a polybenzimidazole machine shaped substrate prepared from polybenzimidazole powder by a sintering process,
    (c) removing the substrate from the acid bath;
    (d) drying the substrate in an inert atmosphere for a time of about one to seven days, and
    (e) heat treating the substrate at a temperature of about 350° C. to 450° C.

2. A process according to claim 1 wherein the Lowry-Bronsted acid is a member selected from the group consisting of phosphoric acid, phosphorous acid, phenyl phosphoric acid, phosphoryl chloride, sulfuric acid, sulfurous acid, sulfamic acid, phosphomolybdic acid, silicic acid, selenenic acid, phenylselenenic acid, boric acid and mixtures thereof.

3. A process according to claim 1 wherein the substrate is heat treated for a time of about 15 minutes to one hour.

4. A dimensionally stable polybenzimidazole product prepared according to the process of claim 1.

* * * * *